(12) United States Patent
Lu et al.

(10) Patent No.: US 9,718,591 B2
(45) Date of Patent: Aug. 1, 2017

(54) FIXING DEVICE FOR A POWER SUPPLY

(71) Applicant: HON HAI PRECISION INDUSTRY CO., LTD., New Taipei (TW)

(72) Inventors: Hsueh-Chin Lu, New Taipei (TW); Cheng-Hung Teng, New Taipei (TW); Ti-An Tsai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 119 days.

(21) Appl. No.: 14/824,744

(22) Filed: Aug. 12, 2015

(65) Prior Publication Data

US 2017/0023155 A1    Jan. 26, 2017

(51) Int. Cl.
*F16L 3/08* (2006.01)
*B65D 63/10* (2006.01)
*H02G 3/32* (2006.01)
*F16B 5/06* (2006.01)
*F16B 2/10* (2006.01)

(52) U.S. Cl.
CPC ........ *B65D 63/1027* (2013.01); *F16B 5/0685* (2013.01); *H02G 3/32* (2013.01); *B65D 2563/108* (2013.01); *F16B 2/10* (2013.01)

(58) Field of Classification Search
CPC .......... H02G 3/32; H02G 3/30; F16B 21/086; B60R 16/0215; F16L 3/137
USPC .................................................. 248/71, 74.2
See application file for complete search history.

(56) References Cited

U.S. PATENT DOCUMENTS

| | | | | |
|---|---|---|---|---|
| 4,395,009 A | * | 7/1983 | Bormke | H02G 3/32 174/157 |
| 4,526,333 A | * | 7/1985 | Nakama | F16B 2/12 248/229.12 |
| 4,665,588 A | * | 5/1987 | Nakano | F16B 2/08 24/16 PB |
| 4,936,530 A | * | 6/1990 | Wollar | F16B 2/12 248/68.1 |
| 4,982,920 A | * | 1/1991 | Hungerford, Jr. | F16L 3/12 24/487 |
| 5,337,983 A | * | 8/1994 | Mailey | F16L 3/137 248/68.1 |
| 5,730,399 A | * | 3/1998 | Baginski | H02G 3/263 24/16 PB |
| 6,398,169 B1 | * | 6/2002 | Streit | B25B 31/00 248/71 |
| 6,443,403 B1 | * | 9/2002 | Page | F16L 3/1233 24/16 PB |
| 6,464,181 B2 | * | 10/2002 | Sakakura | F16L 3/23 24/16 PB |

(Continued)

FOREIGN PATENT DOCUMENTS

TW    231131    9/1994
TW    D141779   8/2011

*Primary Examiner* — Bradley Duckworth
(74) *Attorney, Agent, or Firm* — Steven Reiss

(57) ABSTRACT

A fixing device includes a fixing member and two fixing belts. The fixing member includes a plate, two fixing portions extending from opposite sides of the plate, and a locking portion located between the two fixing portions. The locking portion includes a locking belt extending from the plate and a connecting portion extending from the plate. The locking belt is locked to the connecting portion to form a locking loop. The two fixing belts are fixed to the two fixing portions.

15 Claims, 5 Drawing Sheets

(56) References Cited

U.S. PATENT DOCUMENTS

| | | | | |
|---|---|---|---|---|
| 6,533,226 B2* | 3/2003 | Geiger | ............... | F16L 3/237 248/68.1 |
| 6,718,597 B2* | 4/2004 | Geiger | ............... | B65D 63/1072 24/16 PB |
| 6,749,157 B2* | 6/2004 | Takeuchi | ............... | F16B 21/084 24/16 PB |
| 7,229,052 B2* | 6/2007 | Takeuchi | ............... | F16B 21/088 24/16 PB |
| 7,753,321 B2* | 7/2010 | Geiger | ............... | B60R 16/0215 248/68.1 |
| 8,028,962 B2* | 10/2011 | Geiger | ............... | F16L 3/12 174/656 |
| 8,313,064 B2* | 11/2012 | Stocker | ............... | F16L 3/18 248/71 |
| 8,899,532 B2* | 12/2014 | Tanaka | ............... | F16B 21/086 24/16 PB |
| 8,950,713 B2* | 2/2015 | Ogasawara | ............... | B60R 11/00 24/16 PB |
| 9,004,417 B2* | 4/2015 | Elsner | ............... | B60R 16/0215 24/115 A |
| 2002/0003195 A1* | 1/2002 | McDowell | ............... | A01K 3/005 248/71 |
| 2014/0131528 A1* | 5/2014 | Blakeley | ............... | H02G 3/32 248/74.2 |
| 2015/0214709 A1* | 7/2015 | Landry | ............... | H02G 3/32 248/74.2 |

* cited by examiner

FIXING DEVICE FOR A POWER SUPPLY

CROSS-REFERENCE TO RELATED APPLICATIONS

This application claims priority to Taiwanese Patent Application No. 104123609 filed on Jul. 21, 2015, the contents of which are incorporated by reference herein.

FIELD

The subject matter herein generally relates to a fixing device for fixing a plug and a socket.

BACKGROUND

In many electronic devices, for example, desktop computers, servers, and Internet appliances, a power supply device is required to provide power to the electronic device. The electronic device is powered while the power supply device is connected to the electronic device.

BRIEF DESCRIPTION OF THE DRAWINGS

Implementations of the present technology will now be described, by way of example only, with reference to the attached figures.

DETAILED DESCRIPTION

Figure 1:
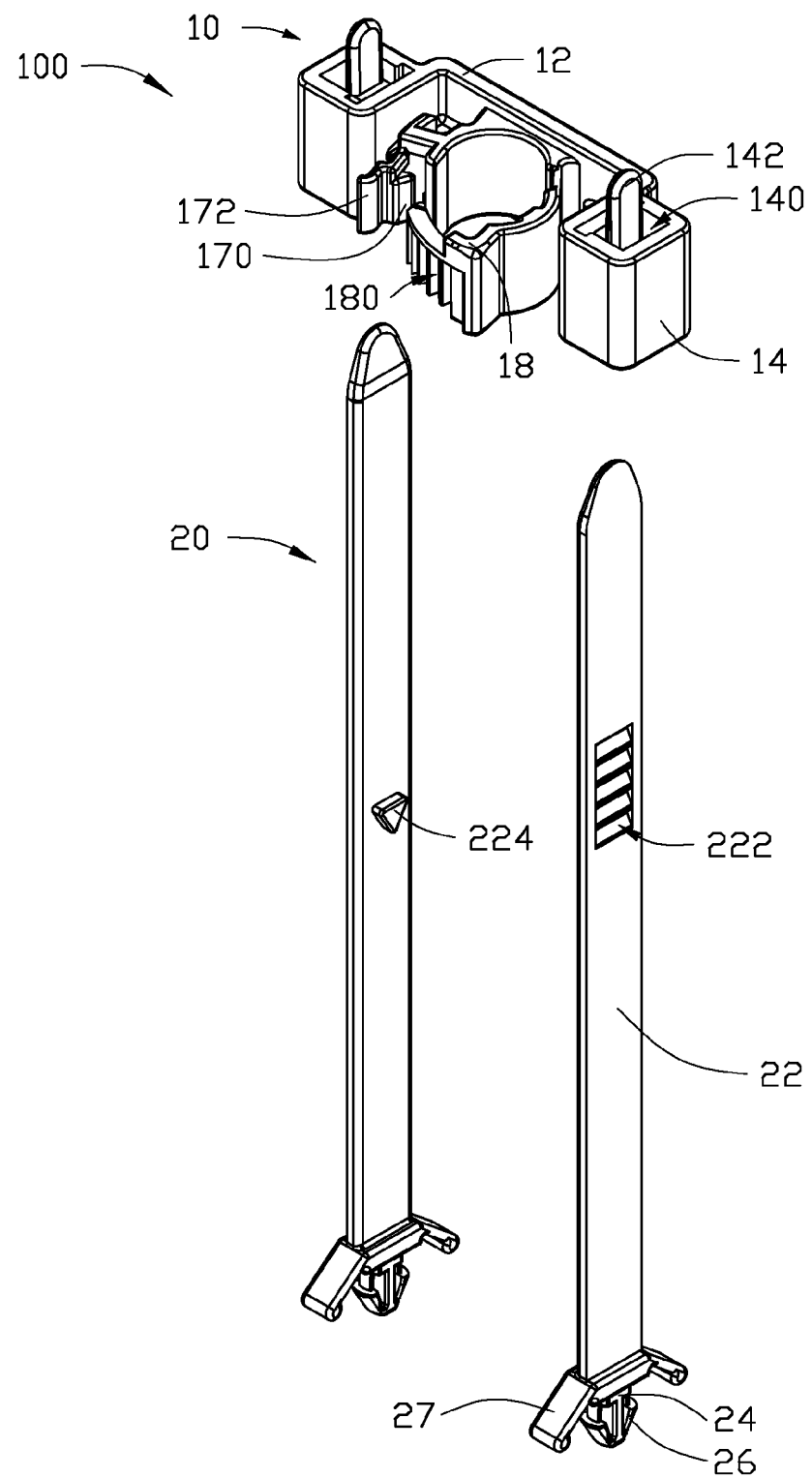
FIG. 1 is an exploded, isometric view of one embodiment of a fixing device.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

The present disclosure is described in relation to a fixing device. The fixing device includes a fixing member and two fixing belts. The fixing member includes a plate, two fixing portions extending from opposite sides of the plate, and a locking portion located between the two fixing portions. The locking portion includes a locking belt extending from the plate and a connecting portion extending from the plate. The locking belt is locked to the connecting portion to form a locking loop. The two fixing belts are fixed to the two fixing portions.

Figure 2:
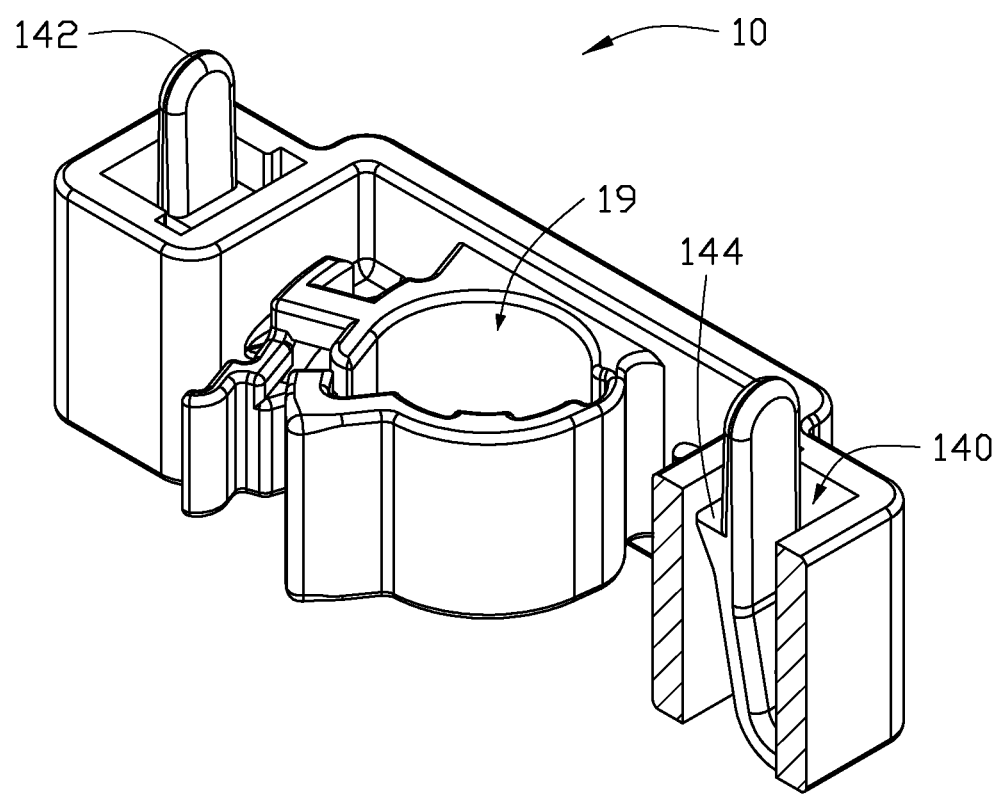
FIG. 2 is a partial cross-sectional, isometric view of a fixing member of the fixing device of FIG. 1.

FIGS. 1-2 illustrate one embodiment of a fixing device 100. The fixing device 100 includes a fixing member 10 and two fixing belts 20.

The fixing member 10 includes a plate 12, two fixing portions 14 extending from opposite sides of the plate 12, and a locking portion 16 (see in FIG. 4) extending from the plate 12. The locking portion 16 is located between the two fixing portions 14. Each fixing portion 14 defines a fixing hole 140, and includes a spring piece 142 and a stopper piece 144. In one embodiment, the spring piece 142 and the stopper piece 144 are located in the fixing hole 140. The spring piece 142 extends from the fixing hole 140. The stopper piece 144 extends from the spring piece 142. In one embodiment, the stopper piece 144 can be substantially perpendicular to the spring piece 142. The locking portion 16 (see in FIG. 4) includes a connecting portion 17 extending from the plate 12 and a locking belt 18 extending from the plate 12. The connecting portion 17 includes a latching portion 170, an operation tab 172, and defines a receiving space 174. The latching portion 170 and the operation tab 172 are located in one side of the receiving space 174. One end of the locking belt 18, away from the plate 12, defines a plurality of slots 180. The locking belt 18 can be received in the receiving space 174, and the latching portion 170 can be latched to one of the plurality of slots 180 to form a locking loop 19.

Each fixing belt 20 includes a main portion 22, a coupling portion 24 extending from the main portion 22, a mounting portion 26 extending from the coupling portion 24, and two elastic portions 27 extending from the main portion 22. The coupling portion 24, the mounting portion 26, and two elastic portions 27 are located on one end of the main portion 22. The main portion 22 defines a plurality of stopper grooves 222 and includes a protrusion 224. The plurality of stopper grooves 222 and the protrusion 224 are located in opposite sides of the main portion 22. In one embodiment, the mounting portion 26 can be substantially V-shaped and protruding from an outer surface of the coupling portion 24. The two elastic portions 27 can be substantially inverted V-shaped.

Figure 3:
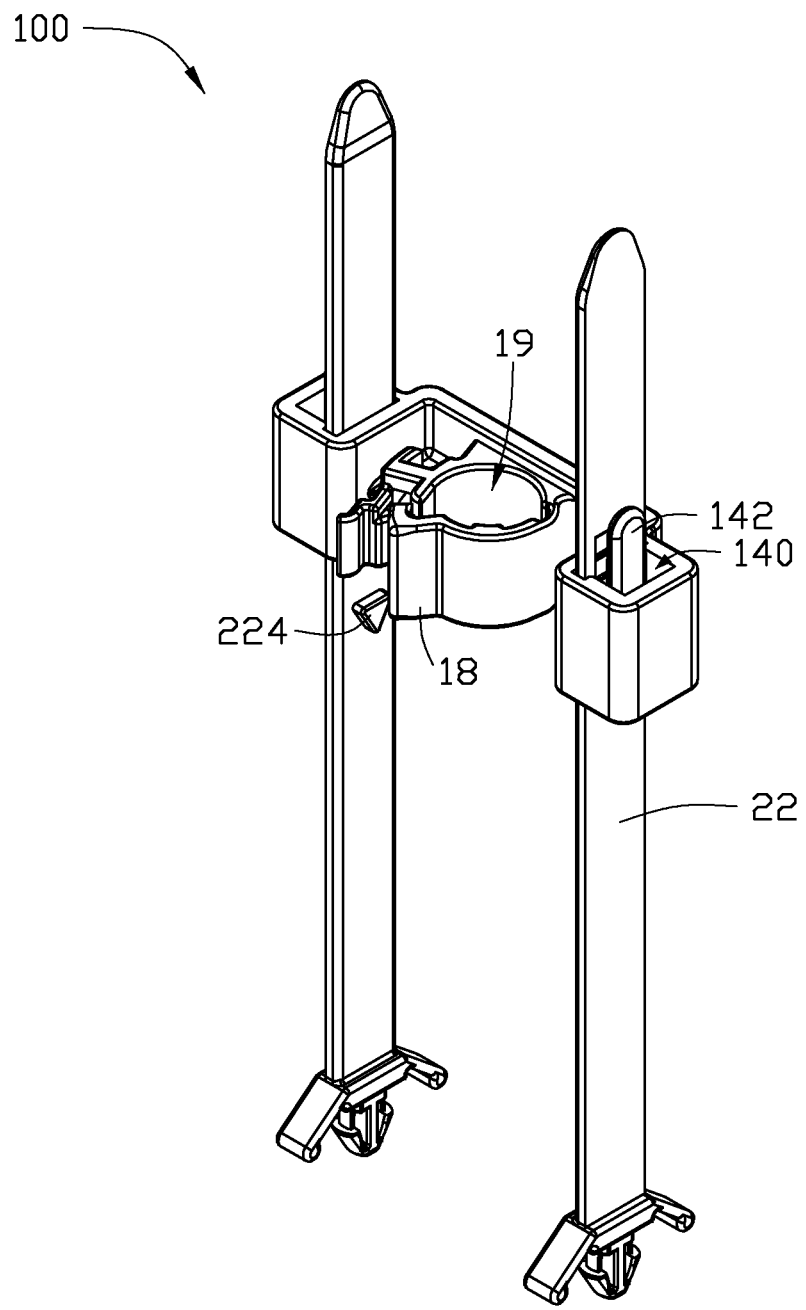
FIG. 3 is an assembled, isometric view of the fixing device of FIG. 1.
Figure 4:
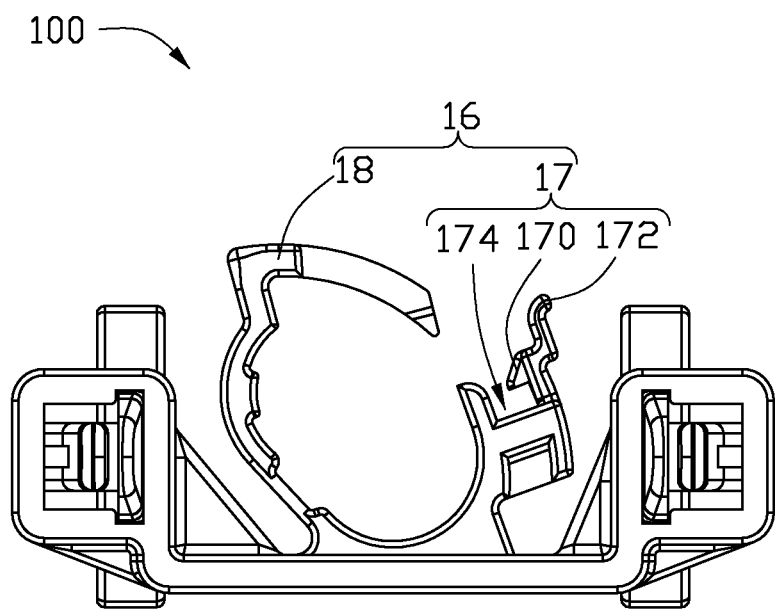
FIG. 4 is a top view of the fixing device of FIG. 3.

FIGS. 3-4 illustrate that the two fixing belts 20 are fixed to the fixing member 10. The spring piece 142 is forced to move to allow the two fixing belts 20 through into the two fixing holes 140. The stopper piece 144 (see in FIG. 2) can be engaged with one of the plurality of stopper grooves 222 (see in FIG. 1) to fix the two fixing belts 20 to the opposite sides of the fixing member 10. The two fixing belts 20 can be substantially parallel to each other. The protrusion 224 can be engaged with the fixing portion 14, for allowing the stopper piece 144 to be engaged with one of the plurality of stopper grooves 222. One end of the locking belt 18 is received in the receiving space 174. The latching portion 170 can be latched to one of the plurality of slots 180 to form the locking loop 19.

Figure 5:
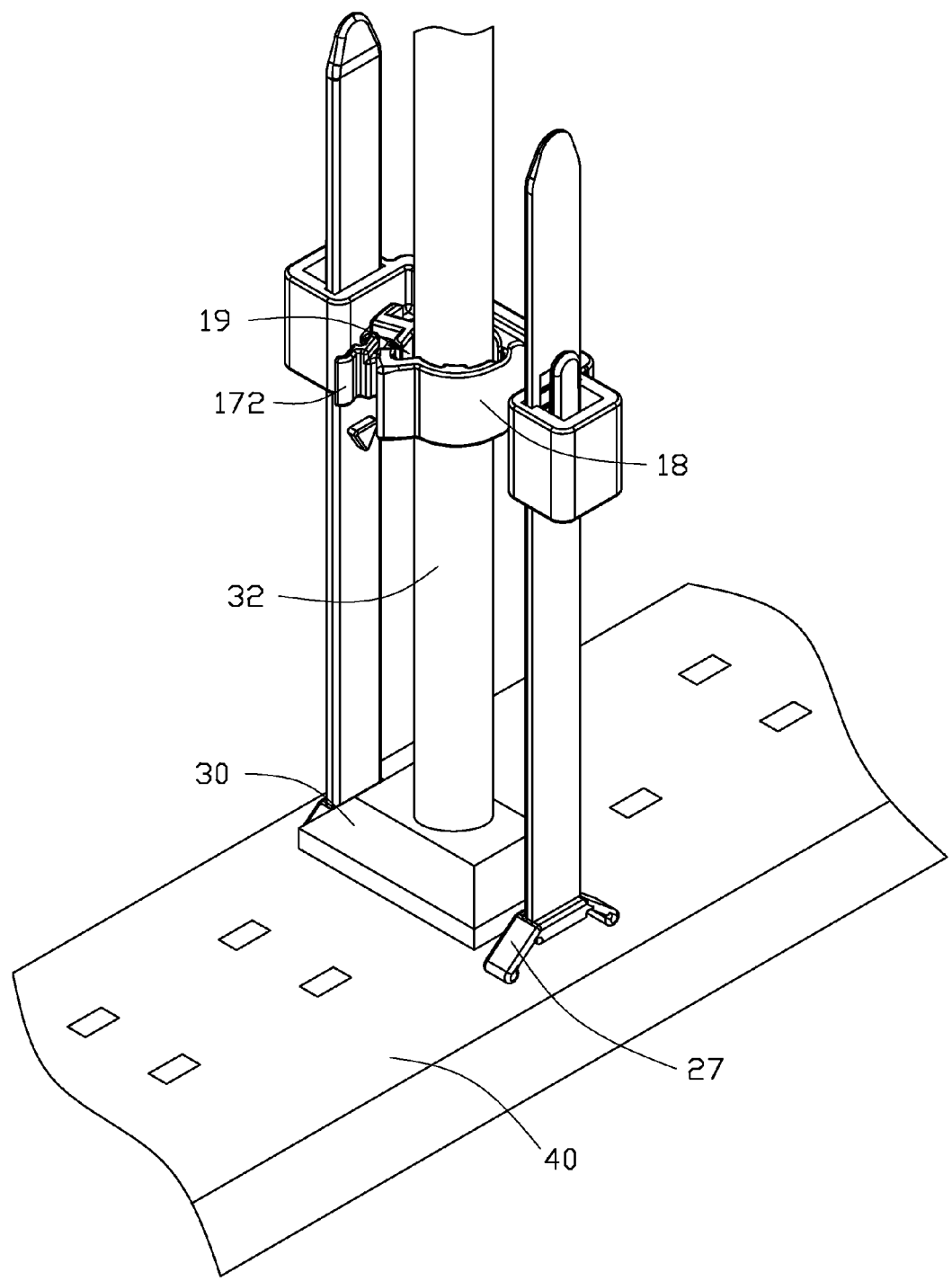
FIG. 5 is an isometric view of the fixing device of FIG. 3 fixed to a plug and a socket.

FIG. 5 illustrates the fixing device 100 fixed to a plug 30 and a socket 40. A cable 32 of the plug 30 is received in the locking loop 19. The locking belt 18 is received in the receiving space 174. The latching portion 170 can be latched to one of the plurality of slots 180 strapping the cable 32 by the locking belt 18. The plug 30 is plugged in to the socket 40. The coupling portion 24 and the mounting portion 26 can be deformable and configured to be received in a hole (not shown) of the socket 40. The two fixing belts 20 are fixed to the socket 40. The two elastic portions 27 can be engaged with the socket 40. The plug 30 is fixed to the socket 40.

When the plug 30 is removed from the socket 40, the two fixing belts 20 remove the coupling portion 24 and the mounting portion 26 from the hole of the socket 40. The operation tab 172 removes the latching portion 170 from the plurality of slots 180. The locking belt 18 is removed from the locking loop 19. The plug 30 can be removed from the socket 40.

The embodiments shown and described above are only examples. Many details are often found in the art such as the other features of the fixing device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A fixing device comprising:
a fixing member comprising a plate, two fixing portions extending from opposite sides of the plate, and a locking portion located between the two fixing portions; and
two fixing belts;
wherein the locking portion comprises a locking belt extending from the plate and a connecting portion extending from the plate, a locking loop is defined by the locking belt and the connecting portion when the locking belt is locked to the connecting portion, and the two fixing belts are fixed to the two fixing portions; wherein a fixing hole is defined in each fixing portion, and each fixing portion comprises a spring piece located in the fixing hole and a stopper piece extending from the spring piece; wherein each fixing belt defines a plurality of stopper grooves, the spring piece is deformable, and the stopper piece is engaged with one of the plurality of stopper grooves to fix the fixing belt to the fixing member; wherein each fixing belt comprises a protrusion, the protrusion and the plurality of stopper grooves are located on opposite sides of the fixing belt, and the protrusion is engaged with the fixing portion to engage the stopper piece with one of the plurality of stopper grooves.

2. The fixing device of claim 1, wherein the stopper piece is substantially perpendicular to the spring piece.

3. The fixing device of claim 1, wherein the locking loop is configured to fix a cable of a plug.

4. The fixing device of claim 3, wherein the locking belt defines a plurality of slots, the connecting portion comprises a latching portion, the connecting portion defines a receiving space, the locking belt is received in the receiving space, and the latching portion is engaged with one of the plurality of slots to fix the cable to the fixing member.

5. The fixing device of claim 1, wherein the two fixing belts are configured to fix with a socket.

6. The fixing device of claim 5, wherein each fixing belt comprises a coupling portion and a mounting portion extending from an outer surface of the coupling portion.

7. The fixing device of claim 6, wherein the mounting portion is substantially V-shaped.

8. The fixing device of claim 1, wherein the two fixing belts are substantially parallel to each other.

9. A fixing device comprising:
a fixing member comprising a plate, and a locking portion extending from the plate; and
a fixing belt;
wherein the locking portion comprises a locking belt extending from the plate and a connecting portion extending from the plate, the locking belt defines a plurality of slots, the connecting portion comprises a latching portion, a locking loop is defined to fix a cable of a plug by the locking belt and the connecting portion when the latching portion is locked to one of the plurality of slots, and the fixing belt is fixed to the fixing member, the fixing member comprises two fixing portions; wherein a fixing hole is defined in each fixing portion, and each fixing portion comprises a spring piece located in the fixing hole and a stopper piece extending from the spring piece; wherein each fixing belt defines a plurality of stopper grooves, the spring piece is deformable, and the stopper piece is engaged with one of the plurality of stopper grooves to fix the fixing belt to the fixing member, the fixing belt comprises a protrusion, the protrusion and the plurality of stopper grooves are located on opposite sides of the fixing belt, and the protrusion is engaged with the fixing portion to engage the stopper piece with one of the plurality of stopper grooves.

10. The fixing device of claim 9, wherein the stopper piece is substantially perpendicular to the spring piece.

11. The fixing device of claim 9, wherein the two fixing portions are extended from opposite sides of the plate.

12. The fixing device of claim 9, wherein the locking portion is located between the two fixing portions.

13. The fixing device of claim 9, wherein the connecting portion defines a receiving space, and the locking belt is received in the receiving space.

14. The fixing device of claim 9, wherein the fixing belt is configured to fix with a socket.

15. The fixing device of claim 14, wherein the fixing belt comprises a coupling portion and a mounting portion extending from an outer surface of the coupling portion.

* * * * *